US010070634B2

(12) United States Patent
Gunnarsson et al.

(10) Patent No.: US 10,070,634 B2
(45) Date of Patent: Sep. 11, 2018

(54) FISHING NET FRAME LINE AND CODEND WITH IMPROVED FISH ESCAPE PROPERTIES

(71) Applicant: HAMPIDJAN HF., Reykjavik (IS)

(72) Inventors: Gudmundur Gunnarsson, Hafnarfjordur (IS); Hjortur Erlendsson, Kopavogur (IS)

(73) Assignee: Hampidjan, HF, Reykjavik (IS)

(*) Notice: Subject to any disclaimer, the term of this patent is extended or adjusted under 35 U.S.C. 154(b) by 0 days.

(21) Appl. No.: 14/762,810

(22) PCT Filed: Nov. 20, 2014

(86) PCT No.: PCT/IS2014/050010
§ 371 (c)(1),
(2) Date: Jul. 23, 2015

(87) PCT Pub. No.: WO2015/075750
PCT Pub. Date: May 28, 2015

(65) Prior Publication Data
US 2016/0249594 A1    Sep. 1, 2016

(51) Int. Cl.
*A01K 75/00* (2006.01)
*A01K 73/02* (2006.01)
*D04G 1/00* (2006.01)
*D04G 5/00* (2006.01)

(52) U.S. Cl.
CPC ............ *A01K 75/00* (2013.01); *A01K 73/02* (2013.01); *D04G 1/00* (2013.01); *D04G 5/00* (2013.01)

(58) Field of Classification Search
CPC .......... A01K 73/02; A01K 75/00; D04G 1/00; D04G 5/00
See application file for complete search history.

(56) References Cited

U.S. PATENT DOCUMENTS

| 3,975,980 | A | * | 8/1976 | Hood | D07B 5/005 |
| | | | | | 114/243 |
| 4,030,401 | A | * | 6/1977 | Hood | D07B 5/005 |
| | | | | | 57/207 |
| 5,067,384 | A | * | 11/1991 | Scala | D04C 3/10 |
| | | | | | 87/11 |
| 7,568,418 | B2 | * | 8/2009 | Kijesky | A62B 1/14 |
| | | | | | 87/6 |
| 2011/0162414 | A1 | * | 7/2011 | Smith | D04B 3/00 |
| | | | | | 66/169 R |
| 2012/0060278 | A1 | * | 3/2012 | McCurdy | D07B 1/02 |
| | | | | | 5/120 |

* cited by examiner

*Primary Examiner* — Shaun R Hurley
(74) *Attorney, Agent, or Firm* — Donald E. Schreiber

(57) ABSTRACT

A lace line for forming structures including netting, such as codends, trawl nets, seines and fish pens, The lace line includes at least several distinct loop tails that are interlaced and/or interconnected with one another so as to form several lacing loops, In other aspects, the present disclosure teaches a codend including at least four hung-in riblines having at least four netting panels formed mainly and preferably entirely of T90 mesh, where the T90 mesh mainly and preferably entirely includes a mesh size of between one hundred sixty and one hundred ninety five millimeters, in combination with a hang percentage of between ten and twenty four percent.

12 Claims, 5 Drawing Sheets

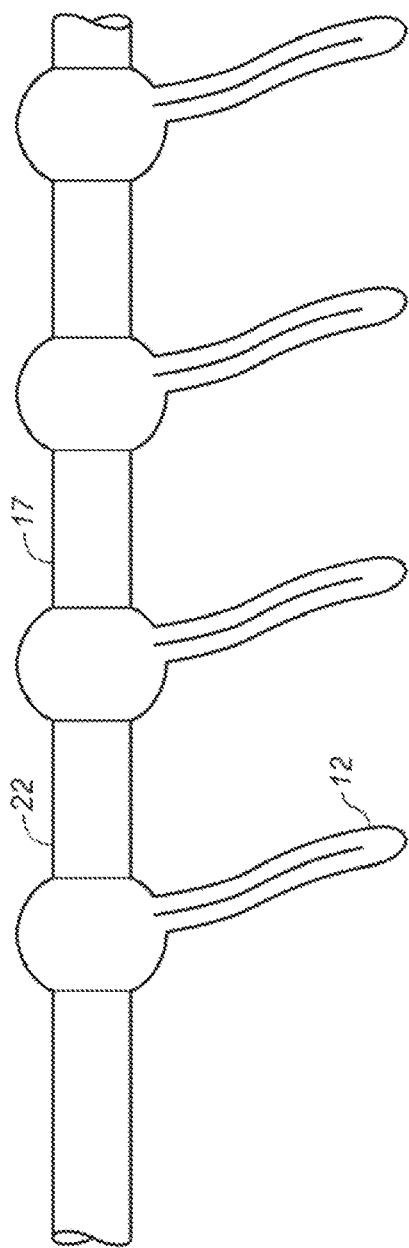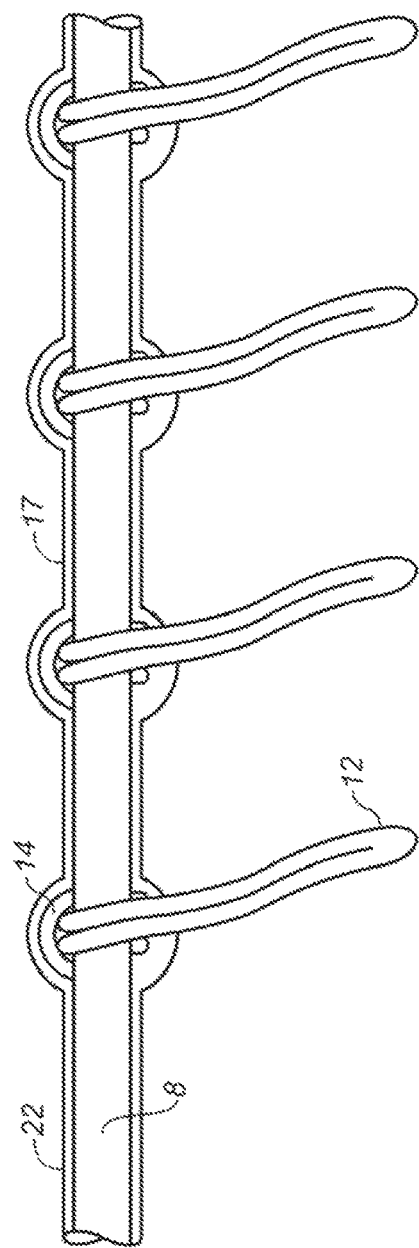
FIG. 8
FIG. 9

FISHING NET FRAME LINE AND CODEND WITH IMPROVED FISH ESCAPE PROPERTIES

FIELD OF INVENTION

The present disclosure relates to fishing nets, including trawl nets, especially to trawl net codends having riblines, and especially to trawls as used to catch fish including but not limited to fish known as cod, Redfish, Haddock, Alaska Pollock, other pollock, Haddock, rockfish, groundfish, roundfish, flatfish and other fish species. More particularly, the present disclosure relates to fish nets having frame lines to which are connected netting; and the present disclosure also relates to trawl "codends" where the codends have riblines and where a particular portion of ribline exhibits a lesser length measured along its long dimension when compared to a length exhibited by the stretch measure length of a portion of netting attached to that particular portion of ribline, where the stretch measure length of the netting is measured in a direction that is along the long dimension of the codend.

TECHNICAL BACKGROUND AND PRIOR ART

There exist various ways of seaming together netting panels forming trawl codends and in attaching such netting panels to riblines also forming the codend, including different tapers, such as point and bar taper, all point taper, cut ratios, tapering ratios, and the use of either square mesh, T0 mesh or T90 mesh. There are a plethora of factors involved in selecting how to design and configure a trawl codend, including whether or not to use riblines, and if riblines are used whether to form a two panel trawl codend that has two riblines, or whether to form a four panel trawl codend that has four riblines, how long to make the riblines relative to the stretch measure of the netting, what construction practices to employ in attaching one panel of netting to another and in attaching the netting to the riblines, and more. Furthermore, there exists no guarantee that a successful fashion of forming a codend for selectively fishing a particular fish species shall be successful for selectively fishing for another particular fish species.

With the current trend toward environmentally sound fishing practices in order to ensure sustainability of valuable fisheries for both fishermen as well as marine mammals and seabirds who depend upon fishery resources, increasingly precise gear designs having particular mesh arrangements in particular locations in the fishing net are required. Problematically, retaining the planned design parameters with current methods for attaching netting panels to frame lines is often so problematic and unreliable that it is not possible to deploy what might otherwise be a well functioning selective fishing net that releases undersized and juvenile fish as well as non-target species.

Thus, it readily can be appreciated that a long felt need exists in the industry for a frame line construction that more easily, more quickly, more simply, more reliably and more economically permits for attaching and, importantly, retaining in place for at least twelve months at a time, netting panels in particular locations relative to a frame line.

Known methods for attaching netting panels to frame lines, such as used in seines, bottom trawls, trawl codends for bottom and pelagic (i.e. "midwater") trawls and back-ends and/or bellies for midwater trawls involve either directly lashing netting panels to a frame line or frame rope, or first forming yorkings (lacing loops) attached to the frame line, and then lashing netting panels directly to the yorking loops (lacing loops). The advantage of using yorkings (lacing loops) is that the ability of the netting panels to slide along the frame line is eliminated. Present methods for forming yorkings (lacing loops) onto frame lines involve passing a continues length of cord and/or rope through the lacing line in a generally traverse direction, pulling the entire continuous length of cord and/or rope through the frame line, knotting the continuous length of cord and/or rope about the frame line in the region of its passage through the frame line, subsequently passing the continuous length of rope through another portion of the frame line, and repeating the process. As the goal is to use a continuous length of loop, due to the fact that the material cost in cutting and retying cords and/or ropes to form each loop or yorking is prohibitively expensive, the man hours and time required to form known yorked frame lines (i.e. "lacing lines") is rather high.

Due to the economic reality of the high cost of materials compared to the cost of labor, forming yorked frame lines with as much as possible a continuous length of rope and/or cord forming each loop and/or lacing loop in the yorked frame line (i.e. "lacing line") is the present state of the art and current trend in the industry.

T90 is a name applied to conventional machine made netting when turned 90 degrees (90°) in relation to the direction usually used in making a trawl. The concept of 'turned mesh' or T90 netting is not new. The use of T90 netting has been investigated since the late 1980s. Testing has demonstrated that T90 netting when used in certain ways possesses some advantageous properties over machine made netting used in the conventional way, usually identified as T0 netting. For example, laboratory tests indicate that T90 netting is stronger than T0 netting. T90 netting technology has been developed for whole trawl application by the Icelandic trawl manufacturer Fjardanet that is part of the Hampidjan group. When used in the codend of a trawl, T90 netting exhibits better catch quality, better selectivity and more efficiency than codends with netting turned in the conventional direction. Experiences using T90 netting in the bellies and codends of groundfish trawls targeting cod found T90 netting filtered out large proportions of undersize cod and the nets had the added benefit of being easier to tow. However trawls and especially their brailer bags formed of T90 netting have acquired a reputation for rupturing under operating conditions in which a brailer bag made of T0 netting does not rupture. Furthermore, trawls or portions of trawls such as codends or brailer bags formed from T90 netting have acquired a reputation for causing excessive gilling of fish, especially in the backend or "belly" of trawls, the "tube" that is forward of a codend or brailer bag, as well as the codend or brailer bag itself.

With respect at least to pelagic trawls formed without riblines, and especially with respect to pelagic trawls whose codends are formed without riblines, and especially with respect to codends lacking hung-in riblines, the above stated problems associated with T90 netting have largely been addressed by teachings contained within published EP application EP2010015862 having Publication number EP2236025A1, and corresponding published U.S. application Ser. No. 12/798,287 with publication No. US 2010242336A1. This has led to markedly improved selectivity and fish escape of undersized, juvenile and non-target species where such fishing gear is in use, promoting sustainable fisheries where such fishing equipment is used.

Thus, it is the current state of the art and the present trend in the industry that codends formed with or mainly with T90 netting either lack riblines, have not more than two riblines.

However, with respect to trawl net codends that are formed with riblines, and especially when compared to trawl net codends with "hung-in" riblines, i.e. codends where the codends have riblines and where at least a particular portion of at least one of the codend's ribline's exhibits a lesser length compared to a length exhibited by a stretch measure length of a portion of netting including several meshes and attached to that particular portion of ribline, the teachings of EP2236025A1 have failed to provide for fishing gear that addresses the above stated problems. Due to above stated problems associated with T90 mesh codends that are formed with hung-in riblines, and mainly and particularly due to severe gilling problems that destroys the ability of the fishing gear to selectively fish, or to safely escape undersize, juvenile or non-target species, while also frustrating fishing of target species and target sized species fish, the use of T90 netting to form most or all of the netting in a riblined codend, and especially in a codend with hung-in riblines, has failed to be successful wherever it has been attempted, earned a negative reputation and has not been adopted by the industry.

As mentioned previously, despite being known for a long time that T90 netting exhibits advantageous properties, such as an the ability to increase water flow and to permit fish selectivity and enhanced fishery sustainability, which are long felt desires and needs in the industry, due to the above stated problems associated with the use of T90 netting in riblined condends, large costs associated with a faulty product such as a codend, and losses in operational revenues from repeated failures of T90 netting when used to mainly or exclusively from the netting of a riblined codend, T90 netting has failed to become widely used in the industry with codends having hung-in riblines, i.e. codends having riblines where the riblines are shorter in length than the stretch measure of a netting panel attached to a particular ribline (the stretch measure measured in a distance along the long dimension of the codend and in a straight line along the center of the netting panel) and has, in fact, earned a generally negative reputation.

However, riblined codends, and especially riblined codends that are hung-in, continue to be the only known codend construction that is economically viable for relatively large fisheries, and fisheries that have substantial environmental interaction with a variety of non-target species, and fisheries whose target species are found in blended concentrations of target and undersized fish.

For example, the current state of the art and the current trend in the industry in fishing for Atlantic Cod, Redfish, Haddock, Atlantic Pollock and bottom cod is to use a two (2) riblined codend forming a two (2) panel codend formed mainly or entirely from T0 netting, T90 netting having failed to be successful in such fisheries and application, and it is the current widely held belief in the industry that T90 netting is not economically or practically useful in such codends and fisheries. It is the trend in the industry that such codends use meshes formed of twines having diameters lesser than four point five millimeter (4.5 mm), it being the widely held belief in the industry that smaller twine diameters in codend mesh leads to improved escape and selectivity; use meshes having mesh sizes lesser than one hundred fifty millimeter (150 mm), it being the widely belief in the industry that mesh sizes larger than one hundred fifty millimeter (150 mm) lead to escape of all or the vast majority of target adult fish and thus are not economically useful or even practically possible to use; and that each panel of the codend have a horizontal stretch measure of at least 4800 mm (forty eight hundred millimeters). Presently, the largest mesh size used for such codends, i.e. riblined codends used for fishing Redfish, Atlantic Cod, Haddock, Atlantic Pollock and other cod, is with a mesh opening (i.e. "inside measurement") of one hundred thirty-five millimeters (135 mm), equating to a mesh size (i.e. "full mesh") value of lesser than one hundred fifty-five millimeters (155 mm), and the meshes forming such codends are entirely or mainly of T0 netting. It is the widely held belief in the industry that in order to maintain the same fishing selectivity for such codends but with T90 in substitution of T0 netting, that a mesh opening (i.e. "insider measurement") of one hundred twenty millimeters (120 mm) is required, e.g. a T90 netting of one hundred thirty five millimeter (135 mm) mesh size (i.e. "full mesh"). While T90 mesh sizes up to equal to and lesser than one hundred sixty millimeters (160 mm) have been proposed in the teachings of EP2236025A1, such T90 mesh size teaching has failed to be adopted by the industry and it is the widely held belief in the industry that such mesh size is incapable of retaining target sized fish and thus is not practically useful.

As indicated above, it is the widely held belief in the industry that that a smaller mesh size must be used when transitioning from T0 netting to T90 netting due to the fact that T90 netting allows for more fish escape than does T0 netting. For this reason, for example, the industry believes that it is needed to use a 135 mm mesh size in T90 netting to replace a 155 mm mesh T0 netting in a codend. In fact, presently, none in the industry believe that it is possible to economically fish with a mesh size of greater than 135 mm for T90 netting on a codend using hung-in riblines, and it is the widely held belief in the industry that such a codend would escape all or nearly all fish, and in fact catch no or essentially no fish, making it economically impractical to use.

Problematically, such fisheries continue to catch and destroy a large amount of juvenile and undersized fish, as well as non-target species. Thus, it can readily be appreciated that a long felt need continues to exist in the industry for a more selective fishing codend construction for fishing Atlantic Cod, Redfish, Haddock, Atlantic Pollock and bottom cod.

Thus, it can readily be appreciated that due to the potential of T90 netting to selectively fish and permit safe escape of juvenile, undersized and non-target species, these practices being so important to sustainability of fisheries for the benefit of marine mammals, seabirds and humans, there exists a long felt need in the industry for a workable teaching that permits most or all of a riblined codend to be formed from T90 netting.

It is presently against the state of the art and contrary to the trend in the industry to form a codend for a trawl where both the codend has riblines that are hung-in and also where the mesh forming the codend is mainly or entirely formed of T90 mesh. It also is against the state of the art and contrary to the trend in the industry to form a riblined codend for a trawl having more than two riblines where the riblines are hung-in and also where the mesh forming the codend is mainly or entirely T90 mesh.

SUMMARY OF INVENTION

An object of the present disclosure to provide for an improved lace line for connecting to and retaining in a desired location, orientation and configuration relative to such lace line netting panels of fishing gear such as but not limited to codends, seines and trawl, and also netting panels of fish pens, and the like, as well as methods for the manufacture and use of such lace line of the present disclosure, so as to better retain in a desired location, orientation and configuration such netting panels, thereby permitting intended consequences of planned construction parameters, especially escape of juvenile, undersized and non-target species.

It is another object of the present disclosure to provide for an improved codend for a trawl that reduces gilling and enhances escape and selectivity of juvenile, undersized and non-target fish species in comparison with known apparatuses and methods for forming trawl codends, so that the reduction of gilling is either complete or to such a magnitude that the gilling is several fold lesser than gilling commonly associated with widely adopted known codends, whether those known codends use T0 netting or T90 netting, and also so that the escape of undersized, juvenile and non-target fish is either complete or several fold more effective than that of known codends.

Briefly the present disclosure is a lace line (17) for forming structures including but not limited to a trawl, seine, codend or fish pen where the lace line is formed of a rope and/or other thread (8), having a plurality of individual loops tails (12) connected to the rope (8), where at least three loop tails are connected at distinct locations on the rope, with at least a first, a middle, and a third loop tail, where the middle loop tail passes through the first loop tail, and subsequently the middle loop tail is itself passed through by the third loop tail, thereby forming at least two lacing loops (16), and at least the third loop tail is fixed to the rope (8) in such a fashion that it forms another lacing loop (16), thereby forming a plurality of lacing loops (16) and thereby providing a lace line of the present disclosure for forming at least the trawl net, seine, codend or fish pen of the present disclosure.

In certain embodiments, after passing through the first loop tail and prior to passing through the third loop tail, the middle loop tail is passed through several mesh cells that are part of at least a panel of netting, thereby eliminating the need to further lash the netting to the lacing loops of the lace line of the present disclosure, and thereby speeding up the manufacture and also any repair of the trawl, seine, codend, fish pen or netting structure formed with the lace line of the present disclosure, and thereby also permitting retaining planned construction parameters for the escape of juvenile, undersized and non-target fish species.

Briefly again, the present disclosure is based upon an unanticipated and surprising discovery that total or near total escape of juvenile, undersized and non-target fish with concurrent economically viable retention of adult target fish selected from species including but not limited to Atlantic Cod, Redfish, Haddock, Atlantic Pollock, Pollock and bottom cod has been achieved by a codend having, in combination: at least four riblines; a hang percentage of greater than ten percent (which is contrary to the state of the art and against the trend in the industry), more preferably of greater than thirteen percent, yet more prefer of greater than fourteen percent, yet even more preferably of greater than fifteen percent, with a hang ratio of nineteen point one percent being most optimal, and with a hang ration of between fifteen percent and twenty percent being useful, with hang ratios of at least fourteen and even greater than twenty percent being useful; netting formed mainly and preferably entirely of T90 netting; the T90 netting having a mesh size equal to or greater than one hundred sixty millimeters (160 mm) (that is contrary to the state of the art and against trend in the industry), and greater than or equal to one hundred seventy-five millimeters. Preferably, the diameter of a twine or of each twine forming a mesh bar and/or forming a mesh leg in the T90 mesh is equal to or greater than five millimeters (5 mm), with diameters equal to or greater than six millimeters (6 mm) being preferred, with a double twine netting construction being preferred.

The construction parameters taught above and herein for the lace line and codend of the present disclosure are new, unprecedented, contrary to the state of the art and against the trend of the industry, provide a surprising and unexpected result of resulting in total or near total escape of undersized, non-target and juvenile fish while concurrently economically retaining target fish of target size, such result never having been achieved before in the industry and addressing a need long felt in the industry.

The above stated advantages of the present disclosure, as well as other advantages of the present disclosure, no doubt shall become readily apparent to those skilled in the art from the following detailed description of a preferred embodiment including when considered in light of the accompanying drawings in which:

BRIEF DESCRIPTION OF THE DRAWINGS

FIG. 8 is a side plan view of the lace line of the present disclosure where the lace line has been coverbraided by being passed through a conventional braiding machine, and having the free portions of the loops connected to the rope forming the lace line pulled out from within the interior of the converging strands that converge at the braid point, so as to form a sheath about the rope forming the lace line as well as about the connections of the loops to the rope forming the lace line, while leaving external of the sheath the free ends of the loops.

FIG. 9 is a side plan view of the lace line of the present disclosure of FIG. 8 where a portion of the external sheath of the lace line has been removed to permit viewing components contained within the sheath, effectively showing the sheath in a cross cut view, where such components that are within the sheath, as well as where the remainder of the lace line are shown in side plan view.

DETAILED DESCRIPTION

Figure 1:
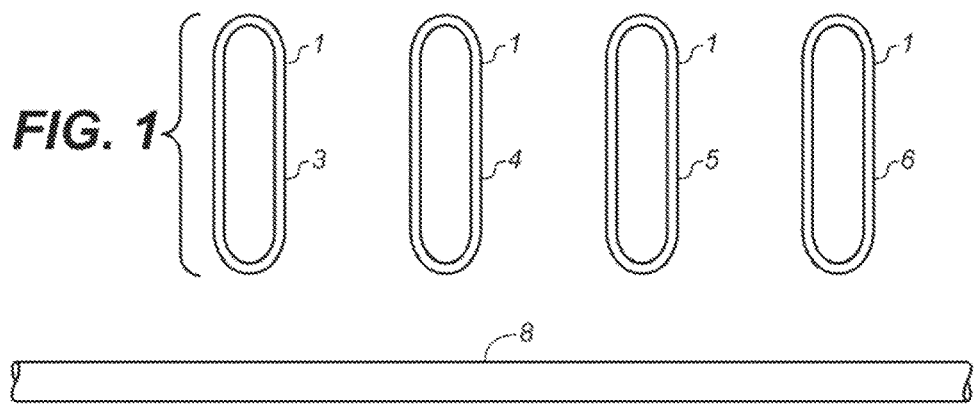
FIGS. 1 to 6 are side plan views of components and manufacture stages of the lace line of the present disclosure.

Definitions:

The term "hung-in ribline" shall be mean a ribline, including a lace line or any other line (e.g. rope, cable or chain or other thread) used as a ribline, where either the entire ribline or at least a particular portion of ribline exhibits a lesser length measured along its long dimension when compared to a length exhibited by the stretch measure length of a portion of netting attached to that particular portion of ribline, where the stretch measure length of the portion of netting is measured in a direction that is along the long dimension of the codend.

The term "hang percentage", in reference to a ribline of a codend, and the term "hang of a ribline" and/or "ribline hang" means that at least one of the riblines has a certain portion that is shorter than a stretch measure length of a corresponding portion of a netting panel attached to the certain portion of the ribline when the netting panel's stretch measurement is taken in a direction along the long dimension of the codend. The "hang percentage" is obtained by the following equation:

(Hang Percentage)=(the length of the certain portion of ribline)/(the stretch measure length of the corresponding portion of the netting panel attached to the certain portion of the ribline).

"Lace Line" most broadly means a strength member to which is attached netting. More narrowly, "lace lines" include a strength member to which is attached structure or strutures of lesser tensile strength than the strength member itself, to which structure or structures is attached the netting. Lace Lines and associated netting are used in fishing nets and apparatuses for fising operations and/or fish farming operations, such apparatuses including but not limited to: trawls, seines, codends, fish pens and other. When used in fishing nets, lace lines can be used to form structures including, but not limited to, riblines, headlines, sidelines and fishing lines (e.g. footropes or portions of footropes). Some codends have riblines, and some do not. When lace lines are used in forming codends that are themselves used in conjunction with trawls, lace lines often are referred to as riblines.

"Mesh size" means the overall length (i.e. the "span") of a closed and taught mesh cell when such closed and taught mesh cell is measured along a straight line oriented in the T0 (T zero) direction and the measurement spans one knot and two mesh legs. This measurement effectively includes the span of one knot and of two mesh bars, as, when taken in the T0 direction. "Mesh size" also is referred to in the industry as "knot-to-knot", and also is referred to in the industry as "full mesh". In the case of "knotless netting", there is a woven intersection that substitutes the term "knot" for purposes of the above definition of "mesh size".

"Mesh opening" is measured when the mesh cell is closed and pulled taught, and is defined by a distance taken along the T0 (T zero) direction and also taken along a straight line situated within the open space of a mesh cell, and measured between, but not including, two opposing knots (or woven intersections in the case of "knotless netting"). For a particular mesh cell, the "mesh opening" always defines a scalar value that is lesser than "mesh size". For example, a one hundred millimeter mesh cell may have a mesh opening of eighty millimeter. "Mesh opening" also is referred to in the industry as "inside measurement", when referring to mesh and netting (i.e. when not referring to trawl mouth opening or interior codend opening).

"Panel" means a portion of netting formed of a plurality of meshes. Panels are used in a structure formed of netting, such as a codend. Panels of a distinct mesh type may include all or only a part of the netting that is between two or more selvedges, riblines or "corners" of a trawl. Panels are connected to one another along their fore and aft edges by seams. Synonyms for the word "panel" include "netting panel", "portion of netting", "piece of netting", "section of netting", "netting" and other.

"Seam" is used as both a noun and a verb. As a noun "seam" means the connection zone or portion of a trawl where any two or more portions and/or panels of netting are connected to one another, especially along forward and aft edges, and where each portion and/or panel of netting includes at least several full mesh cells. As a verb "seam" means to connect or join together a zone or portion of a trawl. Most commonly, two different panels of machine made netting are hand sewn to one another by hand weaving a series of half mesh used to connect the two or more portions and/or panels of netting.

"Thread" shall mean any elongate structure that is both flexible and capable of bearing load and/or tension. The term "thread" includes, but is not limited to, any quantity of: rope, cable, hawser, strap, woven or braided strip and/or belt, monofilament, a group of filaments and/or fibers, strand, yarn, cordage and also textile elements, whether singularly or in plurality.

Synonyms:

For purposes of the present disclosure:

The terms "codend", "brailer", "brailer bag", "bag", "tube" and "intermediate tube" shall be interchangeable, and the term "codend is not limited to these synonyms, there being many synonyms for codend. A codend can be formed of multiple sub-sections each capable of being used as a codend.

In reference to FIGS. 1 to 5:

While various constructions and methods can be used to arrive at and form the lace line of the present disclosure, that is, a lace line including the rope and/or thread 8 to which are attached several loop tails 12, that are subsequently interconnected to form several lacing loops 16, the following description provides a method for manufacturing a most preferred embodiment of a lace line of the present disclosure, for which the following steps are taught:

Step 1: With reference to FIG. 1:

A plurality of individual loops 1 are provided. At least three loops are provided, as shown by individual, and distinct, loops 3, 4, 5 and 6. Each of the individual loops is formed of a distinct portion of material and is not connected by the material forming the loop to any other of the individual loops.

The loops preferably are flexible, and preferably are formed of cordage, such as hollow braided cord and/or twine formed mainly, and preferably entirely, of synthetic fibers and/or filaments such as but not limited to polyamide (nylon) or High-Modulus Polyethylene (HMPE) (e.g. Dyneema) cord. A preferred method for forming the loops is to splice into its own cut ends a portion of hollow braided cord. Less preferably, the loops may also be formed from wire cable.

Figure 2:
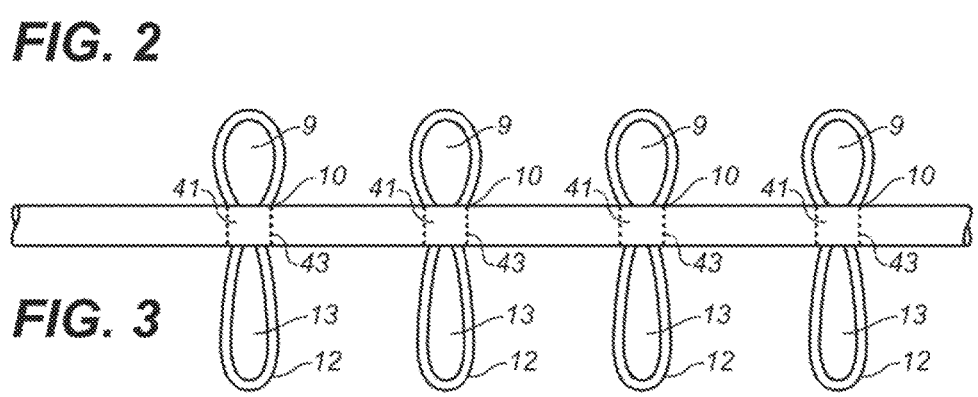

Step 2: With reference to FIG. 2:

A rope 8 is provided. While a rope is the presently preferred structure for rope 8, rope 8 may in some instances may be substituted by a strap or other thread. The term "thread" for purposes of the present disclosure includes any rope, cable, chain or other strength member. The rope 8 preferably has a greater break strength than cordage selected to form any individual loop 1, and preferably has a diameter greater than a diameter of cordage selected to form any individual loop 1. The rope preferably includes a strength member that is formed of several strands (e.g. sub-strands) that themselves are formed mainly or entirely of synthetic fibers and/or filaments that are formed of HMPE (e.g. Dyneema), but may also be formed of polyamide, other synthetic substances, or natural substances such as steel wire. When formed of synthetic fibers, the rope preferably is formed with several substrands that are themselves formed of twisted fibers and/or filaments, or that are themselves formed of braided strands. The rope preferably includes at least one eye, and preferably includes an eye formed into each end of the rope.

The rope preferably has been compacted and pre-stretched such as by being subjected to tensions of sufficient magnitude to remove constructional elongation from the rope, and, in the case of a rope formed of HMPE, the rope preferably as been subjected to sufficient heat and tension so as to both remove constructional elongation as well as to elongate HMPE fibers and/or filaments forming the rope so that the fibers and/or filaments forming the rope maximally distribute load that the rope is subjected to. A preferred method for forming the rope 8 is a method taught by teachings of a published PCT application having International Publication Number WO 2011/009924 A2, and specifically in reference to a process for forming a high strength rope related to claim numbers 22 to 31 of this International Publication.

Figure 3:
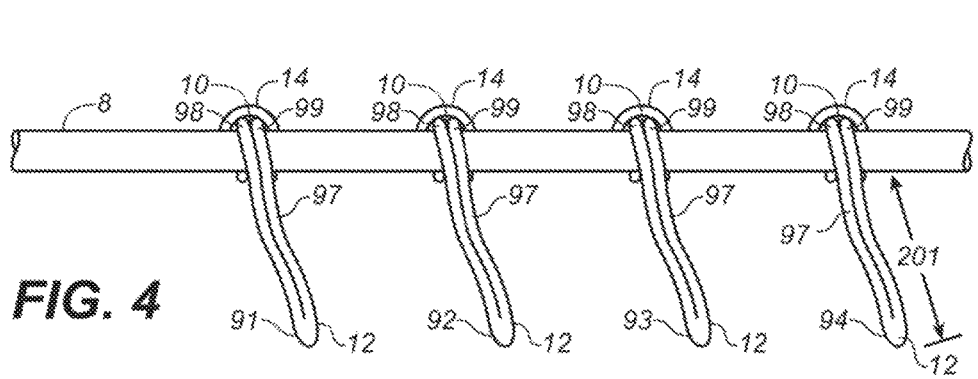

Step 3: With reference to FIG. 3:

The loops 1 are connected to the rope 8. Preferably, each distinct loop 1 is connected to rope 8 at a distinct location 10 along the long dimension of rope 8, where such distinct locations 10 preferably are spaced so as to be equidistant from one another.

Figure 12:
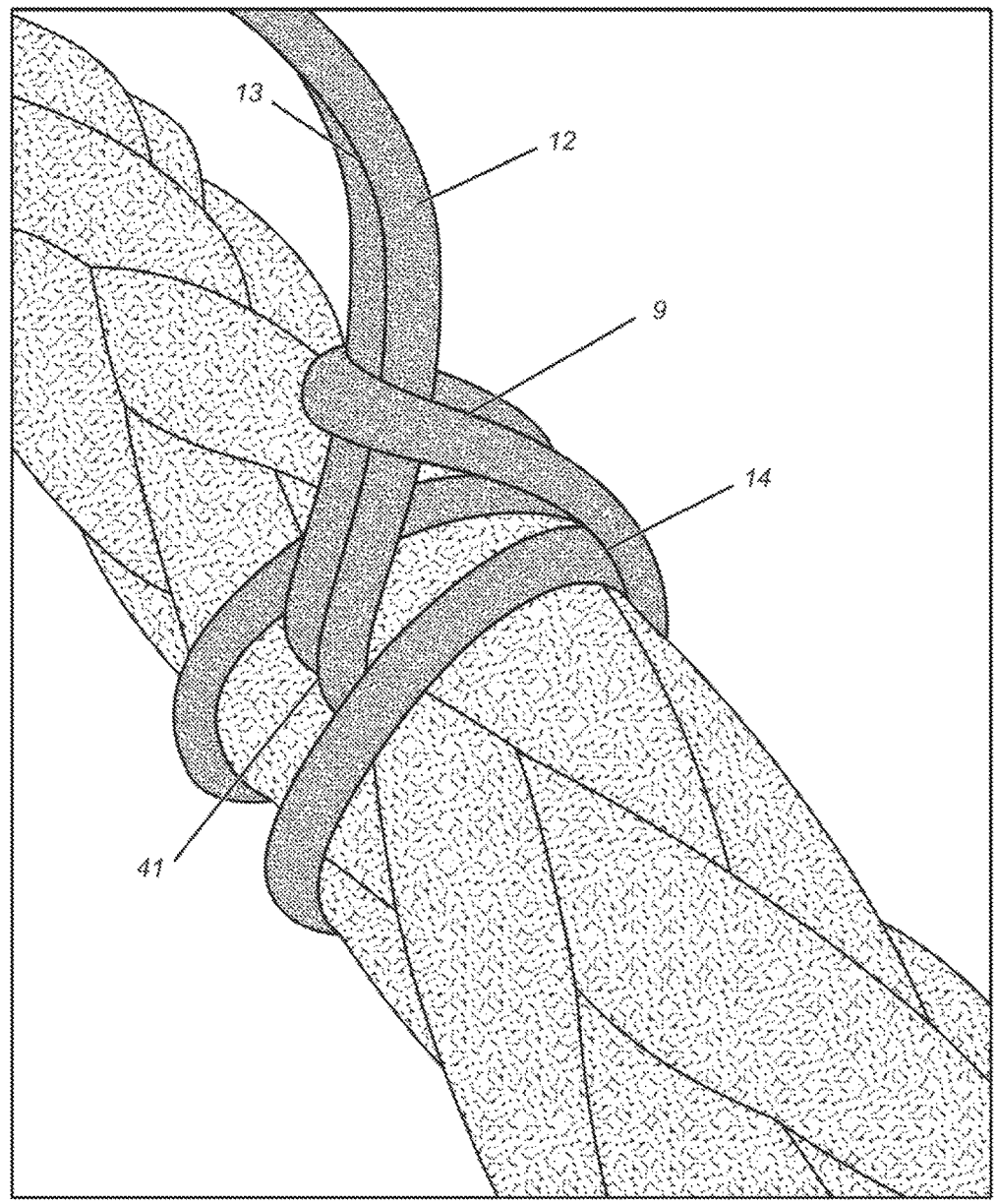
FIG. 12 is a photograph of a portion of the lace line of the present disclosure showing a preferred method for forming a knot or connection 14 for affixing a loop 1 to a thread 8 so as to form loop tails 12 used in forming the lace line 17 of the present disclosure.

There exist several fashions for connecting the loops to the rope, including lashing, binding, knotting, and a combination of such. A presently preferred fashion for connecting a distinct loop 1 to the rope is through the following steps A to E, which include to:

A. provide several distinct loops 1, then to pass each of the several distinct loops 1 each transversely through a distinct aperture and/or passage 41 that is formed so as to form a passage traversing the short dimension of rope 8, as indicated by imaginary dashed lines 43, at each distinct location 10 (a hammer and/or sledge and a spike may be used to form an opening transverse in the rope 8 for passing at least a portion of loop 1 through the passage in thread 8). Each loop 1 is passed through each aperture 41 in such a fashion so as to leave a portion of loop 1 on either side of rope 8, thereby providing, for each distinct loop 1, first loop opening 9 and second loop opening 13, the second loop opening 13 being formed by a loop tail 12;

B. pass each distinct second loop opening 13 of each distinct loop tail 12 through its corresponding first loop opening 9;

C. make another wrap about thread 8 with the remaining portion of first loop opening 9 (see photograph FIG. 12);

D. make a second pass of each distinct second loop opening 13 of each distinct loop tail 12 through its corresponding first loop opening 9; and E. pull taught each distinct second loop opening 13 of each loop tail 12 in a direction distal the rope 8 relative to first loop opening 9, so as to tighten loop opening 9 and form knot 14 (see also photograph FIG. 12), while also maximizing the dimension of loop tail 12.

Step 3a: Optionally, but most preferably, after step 2 the lace line of the present disclosure and more particularly the rope 8 used in forming the lace line of the present disclosure is again subjected to the compacting and pre-stretching processes stated in Step 2 above.

Figure 4:
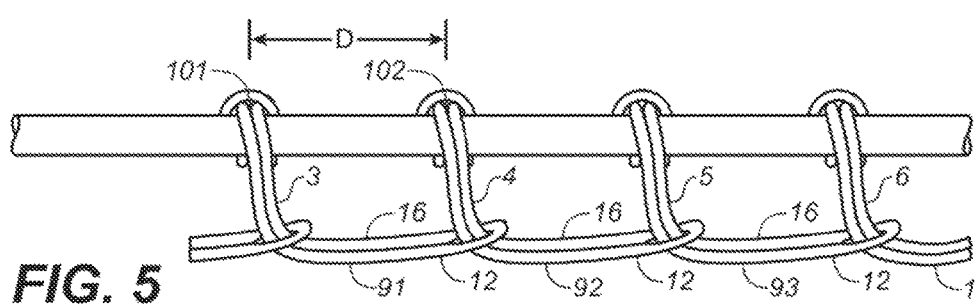
Figure 5:
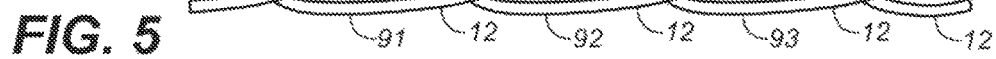

Step 4: With reference to FIG. 4 and FIG. 5: The yorking loops 16, i.e. lacing line loops 16, are now formed by passing the a first distinct loop tail 92 through the opening 13 of a second distinct loop tail 91 that is adjacent to the first distinct loop tail 92, and then by subsequently passing another distinct loop tail 93 (that is located on the opposite side of the first loop tail 92 relative to loop tail 91) through opening 13 of loop tail 92 as shown in FIG. 4, and repeating the process as often as desired for subsequent distinct loops tails.

After forming a desired quantity of lacing loops 16, the end of loop tail 12 of, for example, loop tail 94 may then be connected to the rope 8, such as by lashing 19 (see FIG. 6 and FIG. 7) thereby fixing in place all yorking and/or lacing loops 16.

Figure 6:
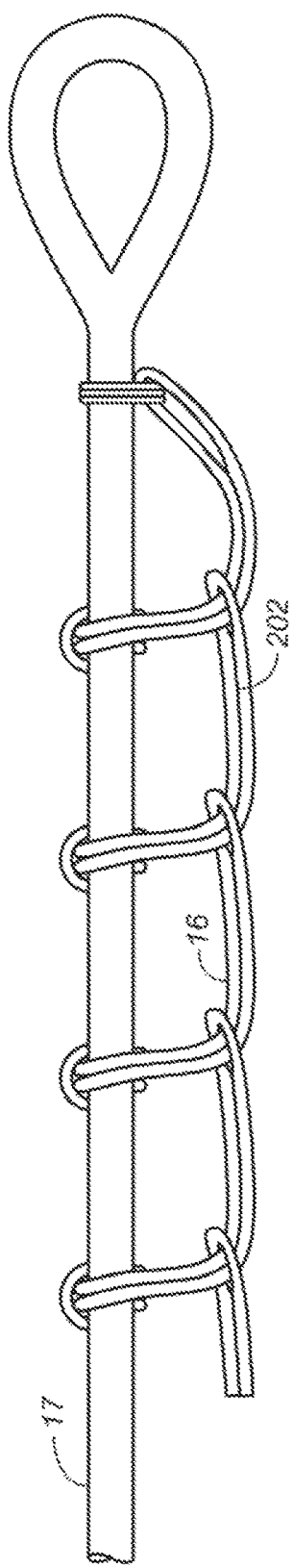

The result of the above manufacturing process is to produce the lace line 17 of the present disclosure shown in FIG. 6 and having a plurality of lacing loops 16 (i.e. yorking loops 16).

Figure 7:
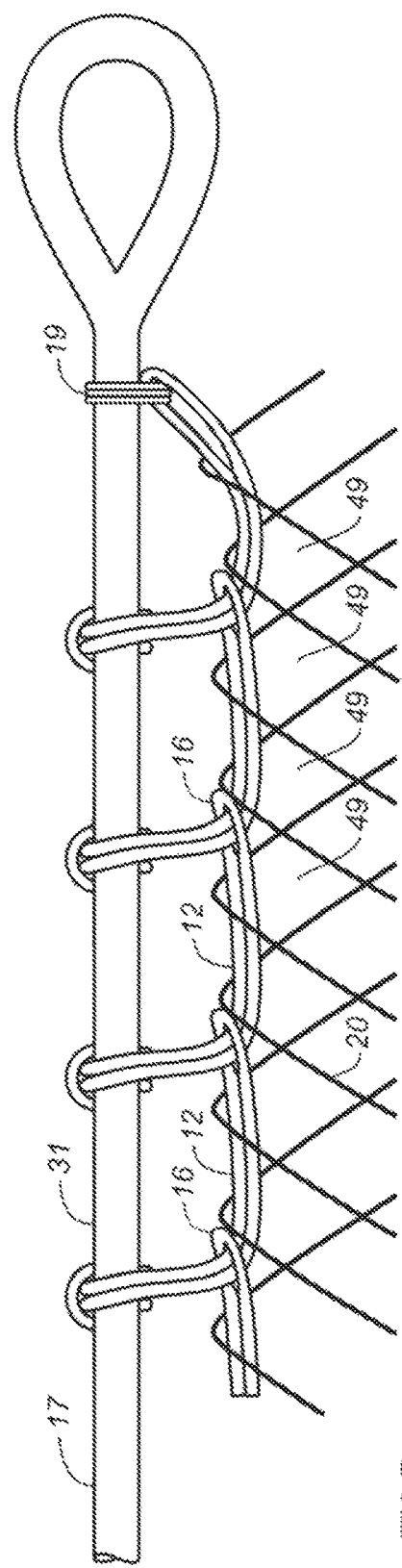
FIG. 7 is a side plan view of the lace line of the present disclosure connected to a sheet of netting, such as may form a codend of the present disclosure.

The lace line 17 may then be attached to netting using known methods, or, alternatively, and as shown in FIG. 7, the netting may be attached directly to the lacing loops 16 by having each loop tail 12 pass through a predetermined quantity of mesh cells prior to having a neighboring and subsequent loop tail passed through itself. That is, each loop tail 12 is passed through several mesh cells prior to having a neighboring loop tail passed through its opening 13, thereby connecting to the lace line of the present disclosure a portion of netting 20 that is used in forming a codend, trawl, seine, fish pen, or other. Advantageously, the lace line of the present disclosure retains in precise position netting portions and panels so that design configurations and characteristics of fishing gear that are planned and required for the escape of juvenile, undersized and non-target fish species is able to be maintained during operation of the fishing gear.

A purpose and goal of the taught manufacture method and/or process of the present disclosure is to form a lace line of the present disclosure. Essential to forming a lace line of the present disclosure is to form the intermediate stage and/or phase of a lace line of the present disclosure, that is, to form a structure having at least a rope and/or other thread 8 to which are attached a plurality of loop tails 12 formed of material such as a portion of cordage 97. Vitally, the distance between the two points at which the cordage forming a distinct loop tail 12 permanently contacts and/or attaches to thread 8, that are known herein at least as loop tail cordage thread connection points 98 and 99 (see FIG. 4), is a distance that is lesser than the distance between distinct locations 10 along the rope and/or other thread 8 to which attach the lacing loops 12. Preferably, the distance between loop tail cordage thread connection points 98 and 99 (of a distinct loop tail) is such that the loop tail cordage thread connection points contact one another and pass through a same aperture 41 (see FIG. 3) formed into rope and/or other thread 8, and preferably formed transverse to the long dimension (e.g. the long axis) of thread 8 as indicated by dashed lines 43. Certainly, the distance between loop tail cordage thread connection points 98, 99 is less than twenty percent a distance between distinct locations 10 measured along rope and/or thread 8 when the rope and/or thread 8 is under a tension of two hundred kg, plus or minus five kg.

While the most preferred method for forming the intermediate stage of the lacing loop of the present disclosure has been taught, that is, for forming the combination of rope and/or other thread 8 and the plurality of loop tails 12 attached to the rope and/or other thread 8, there exist other, presently less preferred methods for arriving at and forming such a structure.

For example, and less preferably, a single portion of cordage may be used to form multiple loop tails 12 by, for example: pushing through rope 8 a portion of a length of cordage and withdrawing on an opposite side of rope 8 from the side that the cordage was inserted at a sufficient quantity of the cordage to form at least a loop tail 12, then tying a knot that prevents slippage out of rope 8 of the formed loop tail; then moving to a different portion of rope 8, especially a next distinct location 10, and again passing another portion of the length of cordage through that portion of rope 8 so as to again form another loop tail 12, then also tying the cordage into a knot that prevents slippage out of rope 8 of the formed loop tail; then repeating the process several times, so as to form several loop tails attached to the rope 8. However, this method is not preferred, thought is useful, and is intended to be encompassed by the present disclosure and claims.

Coverbraided Embodiments

With reference to FIG. 8 and FIG. 9:

In order to protect the lace line of the present disclosure from wear and abrasive destruction, the rope 8 forming the lace line of the present disclosure is preferably enclosed within a braided sheath 22 (see FIG. 8 and FIG. 9) after Step 3 above, and most preferably after Step 3a above. This is accomplished by passing the structure formed by the completion of step 3 and/or 3a above through a braiding machine and withdrawing each loop tail 12 prior to it entering the braid point, as is readily comprehended by those of ordinary skill in the art upon having reach the present disclosure. That is, passing through a braiding machine the rope 8 with loops 1 attached, and withdrawing the loop tails 12 of each loop 1 from the converging strands that converge at the braid point so that only the rope 8 and connections 14 are coverbraided, and a very small portion of each loop tail 12, while the majority of each of the loop tails 12 are not enclosed by the braided sheath 22.

Most preferably, prior to the coverbraiding step, and after step 3 and/or 3a, the rope 8 and the connections 14 upon rope 8 are entirely covered and/or coated with a flowable layer of a not yet set phase of an elastic polymeric layer, preferably of polyurethane, preferably having a minimal elasticity of 100% at zero degrees Celsius. The polyurethane, such as might be a two or more component blend of polyurethane, is compressed between the coverbraided sheath 22 and the strength member during the coverbraiding process, filling void spaces between the sheath 22 and the strength member, and is formulated so as to set after completion of the coverbraiding process.

When the step of coverbraiding the rope 8 is selected, as is most preferable, the most preferable method for forming the combination of the coverbraid and the rope 8 with the eyes in the rope 8 includes teachings taught in a published PCT application having International Publication Number WO 2011/009929 A2. The method for forming the splice eye in the strength member itself can be any suitable method.

Examples of the Lace Line of the Present Disclosure and Processes for its Production:

1. A lace line (17) where at least a portion of the lace line (17) has a plurality of lacing loops (16) connected to at least a thread (8) forming the lace line (17), the lace line (17) characterized in that the plurality of lacing loops (16) are formed by a plurality of interconnected individual loop tails (12, 91, 92, 93 and 94) that are attached to the thread (8) forming the lace line, thereby providing for a lace line that is efficient to produce and simple to use, and simple and expediently detachable from and re-attachable to netting panels, thereby also expediting forming and maintaining fishing gear formed with the lace line.
2. The lace line (17) of example 1 further characterized in that at least one of the individual loop tails (91, 92, 93 and 94) is formed from a unique portion of material.
3. The lace line (17) of example 1 further characterized in that at least three of the individual loop tails (91, 92, 93 and 94) are each formed from a distinct portion of material, and wherein each of the distinct portions of material lacks a connection formed by any of said distinct portions of material to another distinct portion of material forming another individual loop tail (12).
4. The lace line (17) of examples 1, 2 and 3 further characterized in that at least one lacing loop (16) is formed by a process including steps of passing an individual loop tail (92) through an opening in another individual loop tail (91), and then subsequently passing yet another loop tail (93) through an opening of the individual loop tail (92), wherein the individual loop tail (92) is situated between loop tails (91) and (93).
5. The lace line (17) of any one of examples 1, 2, 3 and 4 wherein the lace line is further characterized in that the lace line includes a braided sheath (22) formed about the outside of the external surface of both the thread (8) as well as formed about the outside of at least a plurality of connections (14) that connect individual loop tails (12, 91, 92, 93 and 94) to the thread (8).
6. The lace line (17) of example 5 wherein the lace line is further characterized in that the lace line includes an elastic adhesive substance situated between at least the internal surface of the sheath (22) and the external surface of the thread (8).
7. The lace line (17) of any one of examples 1, 2, 3, 4, 5 and 6 wherein the lace line is further characterized in that the thread (8) includes a thermoplastic core surrounded by a sheath enclosing the thermoplastic core, the sheath enclosing the thermoplastic core also being internal at least a strength member forming thread (8), the sheath enclosing the thermoplastic core situated about the external surface of the thermoplastic core and internal at least the strength member forming at least a portion of thread (8), wherein the thermoplastic core is shaped so as to adopt a shape that occupies a space located internal the strength member forming at least a portion of thread (8).
8. The lace line (17) of example 7 wherein the lace line is further characterized in that the sheath that encloses the thermoplastic core and also is internal the strength member forming at least a portion of thread (8) is mainly impermeable to at least a flowable phase of the thermoplastic core.
9. The lace line (17) of examples 1 to 8 wherein the laceline is further characterized in that a distance indicated by reference numeral (201) (see FIG. 4) and defining the length of a collapsed and straightened loop tail (12) is a distance that is lesser than a distance indicated by reference numeral (202) (see FIG. 6) and defining a peripheral distance of at least one lacing loop (16) including at least one loop tail and at least a portion of another loop tail and not including any portion of the lacing loop's periphery that is defined by thread (8)
10. (with reference to FIG. 4 to FIG. 7):

A process for forming at least a portion of at least a lace line (17), the process comprising steps of:
a) providing a thread (8) having a plurality of individual loop tails (12) connected to the thread at distinct location points (10), so as to provide at least a first loop tail (91), at least a middle loop tail (92), and at least a third loop tail (93) connected to the thread at at least three distinct location points (10) along the thread,
and situating the middle loop tail (92) between the first and third loop tails (91, 93);
b) passing the middle loop tail (92) through an opening in the first loop tail (91);
c) subsequent to step (b), passing the third loop tail (93) through an opening in the middle loop tail (92), thereby forming at least two lacing loops (16) (see FIG. 5), thereby providing for a lace line that is efficient to produce and easy to use, including easy to detach and reattach from netting panels.

11. The process of example 10 further characterized by the step of selecting to form the plurality of individual loop tails (12) provided in step (a) formed from at least a portion of cordage (97), and selecting to form each loop tail (12) from at least a portion of cordage (97), and selecting to form at least several of the loop tails (12) each with at least two loop tail cordage thread connection points (98 and 99) permanently contacting thread (8) at a location selected from a group comprising:

a) the same location;
b) a location where, for a distinct loop tail, both loop tail cordage thread connection points (98 and 99) are in contact with one another;
c) a location where, for a distinct loop tail, both loop tail cordage thread connection portions (98 and 99) pass through at least a portion of thread (8) through a passage and/or aperture (41) (see FIG. 3) situated in thread (8) (preferably transverse to the long dimension of thread (8), i.e. transverse to the long axis of thread (8), as indicated by dashed lines (43)), and containing at least two side by side sections of a cordage portion (97) forming a particular loop tail (12);
d) a location where, for a distinct loop tail, both loop tail cordage thread connection portions (98 and 99) pass through at least a portion of thread (8) through the same passage and/or aperture (41) formed into thread (8), with at least two side by side sections of a cordage portion (97) being located within the passage and/or aperture;
e) a location where, for a distinct loop tail, loop tail cordage thread connection points (98 and 99) are situated more proximal (i.e. more close, or more near) to one another than is the average distance (D) (see FIG. 5) measured between adjacent of distinct location points (10) along thread (8) when measured with two hundred kg tension on the thread (8) plus or minus 5 kg tension; and
f) a location where, for a distinct loop tail, the distance between thread connection portions (98 and 99), of a single portion of cordage (97), is between 0% and 21% of a distance (D) (see FIG. 5) measured between a pair (101, 102) of adjacent distinct location points (10) along thread (8) when measured with two hundred kg tension on the thread (8) plus or minus five kg tension.

12. The process of any one of examples 10 and 11 wherein at least ten loop tails are provided and at least nine lacing loops are formed.

13. The process of any one of examples 10 and 11 wherein prior to step (b), the middle loop tail is passed through an opening in at least a portion of netting, thereby attaching the at least a portion of netting to at least one lacing loop.

14. The process of example 12 wherein the majority of loop tails are passed through at least a portion of netting prior to being passed through another loop tail, thereby attaching the at least a portion of netting to the majority of lacing loops.

15. The process of example 14 wherein the process further includes selecting for the at least a portion of netting a portion of netting selected from a group consisting of:
at least a portion of a codend; at least a portion of a trawl; and at least a portion of a seine.

16. The process of example 14 where the process is further characterized by steps of:
a) forming at least four lace lines (17);
b) providing at least four netting panels (33), at least two of the at least four netting panels lying in different planes;
c) connecting the at least four lace lines to the at least four netting panels so as to form a codend having an upper port ribline (32), a lower port ribline (34), an upper starboard ribline (36) and a lower starboard ribline (38), where each one of the riblines is formed of one of the lace lines (17).

Codend Embodiments

Figure 10:
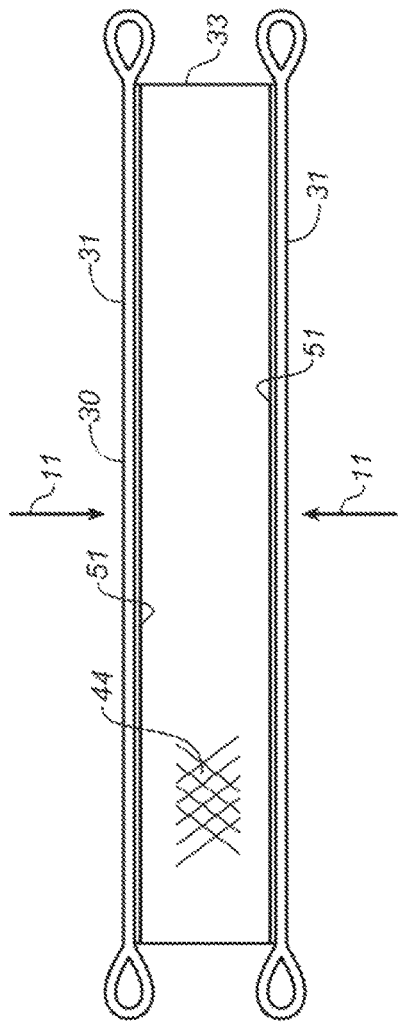
FIG. 10 is a top plan of a codend of the present disclosure.
Figure 11:
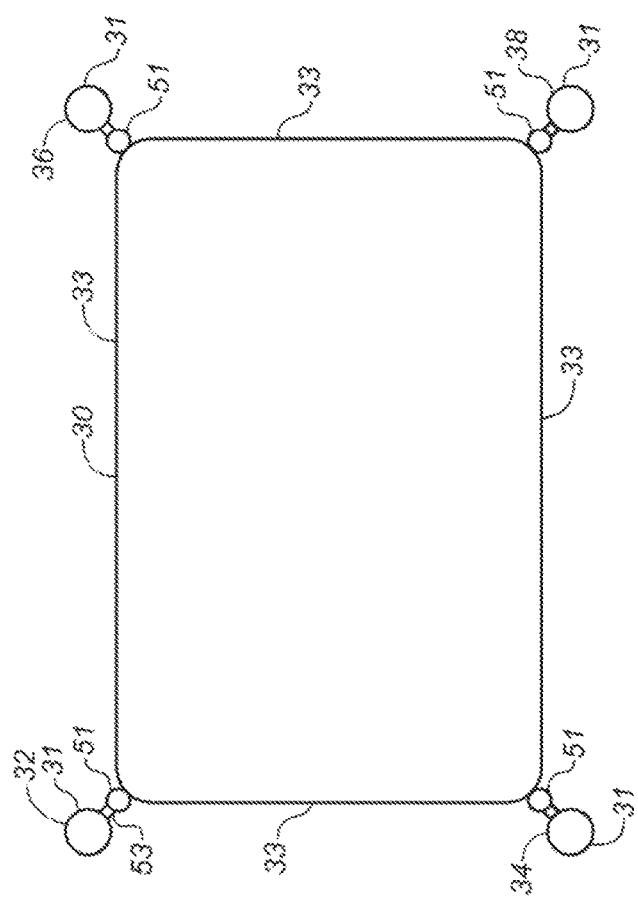
FIG. 11 is a cross sectional view of the codend of the present disclosure taken along section line 11-11 of FIG. 10.

In reference to FIG. 9 and FIG. 10:
The present disclosure is based upon an unanticipated and surprising discovery that total or near total escape of juvenile, undersized and non-target fish with concurrent economically viable retention of adult target fish selected from a group including Atlantic Cod, Redfish, Haddock, Atlantic Pollock and bottom cod is achieved by a codend (30) of the present disclosure having in combination:

at least four riblines (31), at least two of the riblines lying in different planes and attached to netting panels (33) that serve a primary function of physically retaining fish (i.e. not netting situated external the codend relative to another sheet of netting and intended to perform as chaffing gear to protect the netting panels (33) against abrasion and friction). In a presently preferred embodiment of the present disclosure there is an upper port ribline (32), a lower port ribline (34), an upper starboard ribline (36) and a lower starboard ribline (38);

at least four netting panels (33), at least two of the at least four netting panels lying in different planes;

a hang percentage of at least five percent and optimally about ten percent; where the riblines (31) are hung-in relative to the netting panels (33) at a hang percentage that preferably is ten percent, or from nine percent to ten and a half percent, or is in a range of from nine percent to eleven percent, and also, but less preferably, can be in a range of from seven percent to twelve percent, and in some instances, but yet less preferably, can be in a range of from five percent to fifteen and a half percent;

netting panels (33) formed mainly and preferably entirely of T90 netting;

a mesh size for the T90 netting's mesh cells (44) that is equal to or greater than one hundred sixty millimeters (160 mm), as is contrary to the state in the art, against the trend in industry, and contrary to a widely held belief in the industry that netting formed of such a mesh size is capable of retaining sufficient target fish so as to permit economically viable operations; and most preferably netting that has a mesh size that is equal to or greater than one hundred seventy millimeters (170 mm), and even equal to or greater than one hundred eighty millimeters (180 mm), and even equal to or greater than one hundred eighty five millimeters (185 mm), as is contrary to all held beliefs in the industry that hold that such a netting size cannot retain target sized adult fish selected from a group including Atlantic Cod, Redfish, Haddock, Atlantic Pollock and bottom cod.

The total or near total release of juvenile, undersized and non-target fish species with concurrent economically viable retention of adult target fish by the codend construction of the present disclosure is contrary to the state of the art, against the trend in the industry, and contrary to widely held beliefs in the industry that T90 mesh having a greater mesh size than currently used T0 mesh sizes must, necessarily, escape more adult fish, and also contrary to the widely held belief in the industry that T90 mesh must have a mesh size of one hundred thirty five millimeter (135 mm) or lesser in order to retain a percentage of adult target fish that permits for economically viable fishing operations. The codend construction of the present disclosure also is contrary to the state of the art and against the trend of the industry that holds that T90 mesh cannot be used with hung-in codend riblines, and that T90 mesh is only useful in mesh sizes smaller than one hundred thirty-five millimeter (135 mm) and only in codends having two riblines or no riblines.

As shown in FIG. 7, the riblines (31) are optimally formed of the lace line (17) of the present disclosure, in which case the netting panels have peripheral mesh cells (49) threaded directly onto the tail loops (12) forming the lacing loops (16). However, in other embodiments, the periphery of the netting panels may be formed into gores (51) and/or selvedges that are themselves laced and/or knotted using lashing twine (53) directly to either a conventional ribline or to the lace line of the present disclosure forming a ribline of the present disclosure.

For purposes of the present disclosure, when referring to netting used to form a codend of the present disclosure, the netting referred to is netting intended and used to physically retain fish (i.e. not netting situated external the codend relative to another sheet of netting and intended to perform primarily as chaffing gear); and where the mesh size of the netting intended to physically retain fish preferably is equal to or greater than 160 mm (one hundred sixty millimeters); and where the netting intended to physically retain fish is formed of mesh that preferably is "double knotted" mesh (i.e. netting that is formed with two or more adjacent twines and/or strands forming most of the netting's mesh bars and most of the netting's knots).

Examples of the Codend of the Present Disclosure

1. A codend (30) including netting panels, riblines and T90 mesh, the codend characterized in that the codend includes in combination: at least four riblines (31); at least four netting panels (33); at least one of the at least four netting panels formed of mesh that mainly is T90 mesh; a mesh size for at least the majority of the T90 mesh where the mesh size is at least one hundred sixty millimeters, where escape of non-target, juvenile and undersized fish is accomplished with concurrent retention of target sized and target species fish in sufficient quantity and catch rate to enable economic fishing operations.
2. The codend (30) of example 1 wherein the codend is further characterized in that at least two of the riblines are hung-in riblines having a hang percentage.
3. The codend (30) of examples 2 wherein the hang percentage is in a range of from five percent to twenty-four and a half percent.
4. The codend (30) of example 3 wherein the hang percentage is between ten percent and twenty-one percent.
5. The codend (30) of example 3 wherein the hang percentage is between fifteen percent and twenty-one percent.
6. The codend (30) of example 3 wherein the hang percentage is between eighteen percent and twenty-one percent.
7. The codend (30) of example 3 wherein the hang percentage is about nineteen and a half percent.
8. The codend of any one of examples 1 to 7 wherein the T90 mesh mainly includes mesh have a mesh size that is at least one hundred sixty millimeters.
9. The codend of any one of examples 1 to 7 wherein the T90 mesh mainly includes mesh have a mesh size that is greater than one hundred sixty millimeters.
10. The codend of any one of examples 1 to 7 wherein the T90 mesh mainly includes mesh have a mesh size that is at least one hundred seventy millimeters.
11. The codend of any one of examples 1 to 7 wherein the T90 mesh mainly includes mesh have a mesh size that is at least one hundred eighty millimeters.
12. The codend of any one of examples 1 to 7 wherein the T90 mesh mainly includes mesh have a mesh size that is at least one hundred eighty-five millimeters.
13. The codend of any one of examples 1 to 7 wherein the T90 mesh mainly includes mesh have a mesh size that is between one hundred sixty and one hundred ninety-five millimeters.
14. The codend of any one of examples 1 to 13 wherein the T90 mesh mainly includes mesh formed of double knotted mesh, i.e. where a pair of twines form the knots and mesh legs.
15. The codend of any one of examples 1 to 13 wherein twine forming the T90 mesh mainly has a diameter that is greater than five millimeters.
16. The codend of any one of examples 1 to 15 wherein twine forming the T90 mesh mainly is formed as a compact twine (i.e. has a inner core of parallel or laid filaments or fibers enclosed within a very tightly braided sheath).
17. The codend of any one of the preceding examples wherein the codend includes retention straps to control the maximum diameter to which the codend can be distended at any given portion of the codend.
18. The codend of any one of the preceding examples wherein the codend includes either or both zippers, doors or flaps that are held closed by lacing ropes or twines and are capable of being opened so as to permit discharge of fish from the codend.

Although the present disclosure has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications will, no doubt, be suggested to those skilled in the art after having read the preceding disclosure. Accordingly, it is intended that the following claims be interpret¬ed as encompassing all alterations, modifications, or alternative applications as fall within the true spirit and scope of the disclosure including equivalents thereof. In effecting the preceding intent, the following claims shall:

1. not invoke paragraph 6 of 35 U.S.C. § 112 as it exists on the date of filing hereof unless the phrase "means for" appears expressly in the claim's text;
2. omit all elements, steps, or functions not expressly appearing therein unless the element, step or function is expressly de¬scribed as "essen¬tial" or "criti¬cal;"
3. not be limited by any other aspect of the present disclosure which does not appear explicitly in the claim's text unless the element, step or function is expressly de¬scribed as "essen¬tial" or "criti¬cal;" and
4. when including the transition word "comprises" or "com¬pris¬ing" or any variation thereof, encompass a non exclusive inclusion, such that a claim which encom¬passes a process, method, article, or appara¬tus that comprises a list of steps or elements includes not only those steps or elements but may include other steps or elements not expressly or inherently included in the claim's text.

The invention claimed is:
1. A method for producing a lace line (17), the method comprising steps of:

a) forming a structure including a strength member (8) having a plurality of individual loops tails (12) connected to the strength member (8) at distinct locations (10) on the strength member (8);

b) passing the structure formed by the completion of step (a) above through a braiding machine; and c) selecting to withdraw the loop tails (12) from the braiding machine's converging strands that converge at the braid point.

2. The method of claim 1 wherein the method further comprises selecting to withdraw the loop tails (12) from the converging strands prior to the loop tails (12) entering the braid point.

3. The method of claim 1 wherein the method further comprises selecting to withdraw the loop tails (12) from the converging strands that converge at the braid point so that a small portion of each of the loop tails (12) becomes enclosed by a braided sheath (22), while the majority of each of the loop tails (12) is not enclosed by the braided sheath (22).

4. The method of claim 1 further comprising selecting to form individual loop tails (12, 91, 92, 93 and 94) from distinct portions of material.

5. The method of claim 4 further comprising selecting for distinct portions of material forming individual loop tails (12, 91, 92, 93 and 94) distinct portions of material lacking a connection formed by any of said distinct portions of material to another of said distinct portions of material.

6. The method of claim 5 further comprising selecting individual loops (1) for the distinct portions of material forming the loop tails (12, 91, 92, 93 and 94).

7. The method of claim 4 further including selecting to form the individual loop tails (12) by steps comprising providing several distinct loops (1); forming several distinct apertures (41) in the strength member (8) while selecting to form each distinct aperture (41) traversing the short dimension of the strength member (8) at a distinct location (10); and, passing each of several distinct loops (1) each through a distinct aperture (41) at each distinct location (10).

8. The method of claim 7 further comprising passing each distinct loop (1) through each aperture (41) in such a fashion so as to leave a portion of loop (1) on either side of strength member (8), thereby providing, for each distinct loop (1), a first loop opening (9) and a second loop opening (13), the second loop opening (13) forming a loop tail (12); passing each distinct second loop opening (13) of each distinct loop tail (12) through its corresponding first loop opening (9); and, pulling taught each distinct second loop opening (13) of each loop tail (12) so as to tighten loop opening (9).

9. The method, of claim 8 further comprising: i) making a wrap about strength member (8) with the remaining portion of first loop opening (9); and, ii) making a second pass of each distinct second loop opening (13) of each distinct loop tail (12) through its corresponding first loop opening (9).

10. The method of claim 6 further comprising selecting to connect individual loops (1) to the strength member (8) by lashing.

11. The method of claim 6 further comprising selecting to connect individual loops (1) to the strength member (8) by binding.

12. The method of claim 1 further comprising selecting for the strength member (8) a braided strength member; and where the step of passing the structure including a strength member (8) having a plurality of individual loops tails (12) connected to the strength member (8) through a braiding machine further comprises subjecting the strength member to stretching and compacting after having attached to the strength member (8) the plurality of individual loop tails (12) and prior to passing the structure including a strength member (8) having a plurality of individual loops tails (12) connected to the strength member (8) through the braiding machine.

* * * * *